United States Patent [19]

Conti

[11] 4,028,473

[45] June 7, 1977

[54] HYDRAULIC POWERED LUBRICATOR AND SPRAYER

[76] Inventor: Armand R. Conti, 3464 N. Wendover Circle, Youngstown, Ohio 44511

[22] Filed: Feb. 17, 1976

[21] Appl. No.: 658,353

Related U.S. Application Data

[63] Continuation-in-part of Ser. No. 577,698, May 15, 1975, abandoned.

[52] U.S. Cl. ............................ 427/434 E; 118/405; 118/DIG. 18; 222/334

[51] Int. Cl.² ...................... B05C 3/02; G01F 11/02

[58] Field of Search .............. 222/334, 383, 74, 75; 118/405, 404, DIG. 19, DIG. 18; 427/434 E

[56] References Cited

UNITED STATES PATENTS

| | | | |
|---|---|---|---|
| 1,943,818 | 1/1934 | Fantone et al. | 118/405 X |
| 2,102,140 | 12/1937 | Ungar | 222/54 |
| 2,207,487 | 7/1940 | Kirkpatrick | 118/405 |
| 2,348,151 | 5/1944 | Rotter et al. | 222/75 |
| 2,457,128 | 12/1948 | Churnell | 118/405 X |
| 2,478,940 | 8/1949 | Pape | 118/405 X |
| 3,107,034 | 10/1963 | Dunnous | 222/334 X |
| 3,135,620 | 6/1964 | McGrath | 118/405 X |
| 3,265,808 | 8/1966 | Binch | 118/405 X |
| 3,305,137 | 2/1967 | Gauthier et al. | 222/334 X |
| 3,733,216 | 5/1973 | Goldman et al. | 427/434 E |
| 3,801,359 | 4/1974 | Polizzano et al. | 427/434 E |

*Primary Examiner*—Stanley H. Tollberg
*Assistant Examiner*—Hadd Lane
*Attorney, Agent, or Firm*—Brown, Murray, Flick & Peckham

[57] ABSTRACT

Liquids and semiliquids, such as thixotropic gels, oil and greases, are delivered to a discharge means according to a method and through the use of an apparatus powered by hydraulic fluid under pressure which is controlled by a valve for passage to a hydraulic motor that is, in turn, coupled to a pump used to withdraw and pressurize the material for delivery by a conduit line to the discharge means having a discharge orifice that is either nonclosable or synchronously opened. The material is discharged by controlled pressurization which is initiated and terminated by controlling the flow of hydraulic fluid to the hydraulic motor in response to actuation of a trigger or switch on the discharge means. A discharge gun and a lubricator collar are two preferred forms of the discharge means.

12 Claims, 8 Drawing Figures

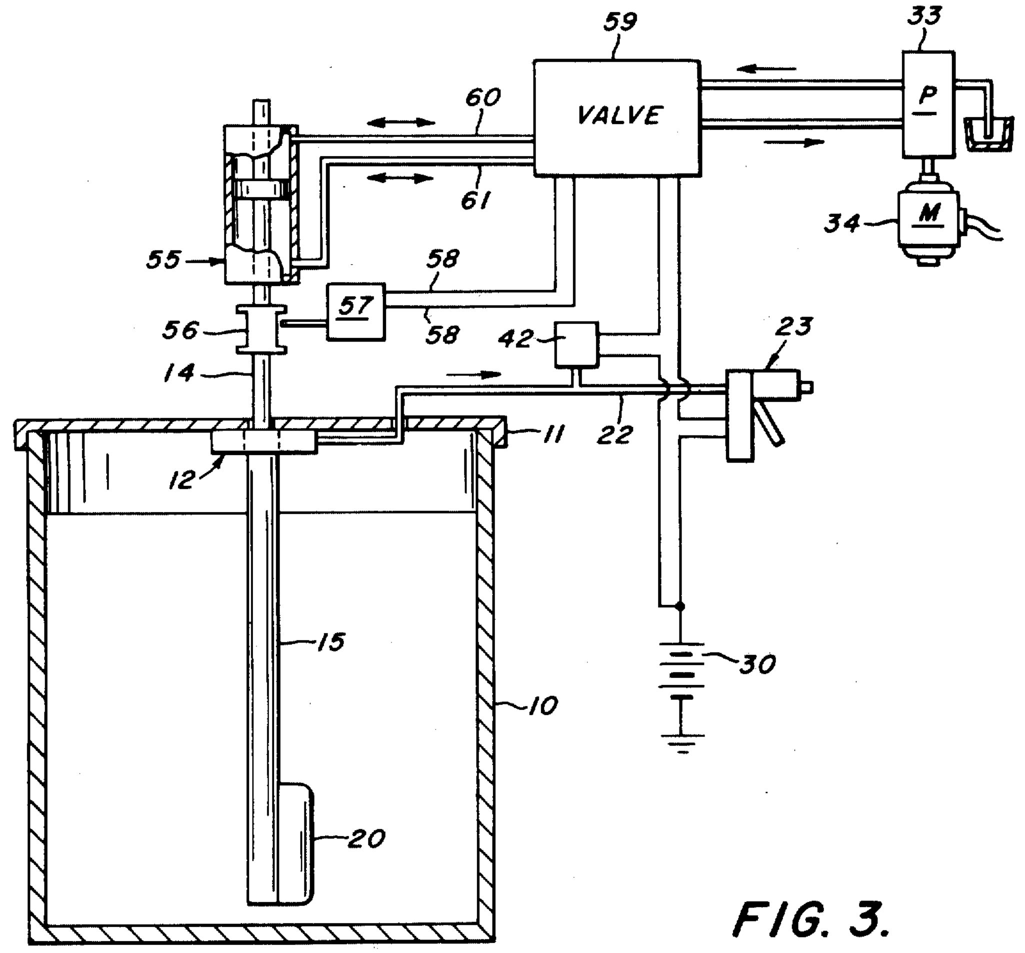
FIG. 3.
FIG. 4.
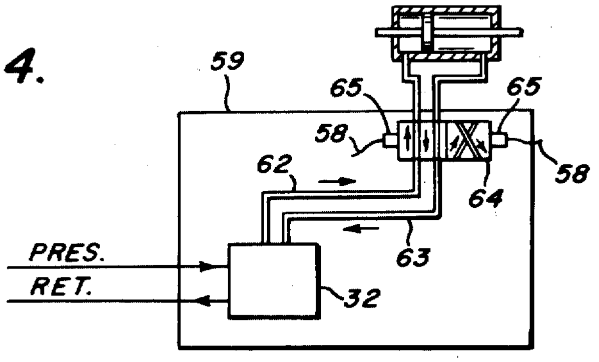

HYDRAULIC POWERED LUBRICATOR AND SPRAYER

CROSS-REFERENCES TO RELATED APPLICATION

This application is a continuation-in-part of application Ser. No. 577,698, filed May 15, 1975, now abandoned.

BACKGROUND OF THE INVENTION

While not limited thereto, the present invention is particularly adapted to the use of hydraulic power for the airless spraying of viscous fluid or semifluid products such as grease, oil, paint, gel-like compounds, sealants, undercoating materials, and the like. More particularly, the present invention relates to a method and apparatus to control a hydraulically-powered pump used to pressurize such materials over an infinitely adjustable range of pressures that includes relatively high pressure, i.e., of the order of 10,000 pounds per square inch, for discharge of the pressurized material from a nonclosable or synchronously opened orifice in the casing of a spray device.

In the past, the nozzle opening of an airless spray gun has been supplied with the material to be sprayed at pressures ranging from 800 to 900 pounds per square inch. It is known in the art to pressurize paint, for example, to pressures of about 2,000 pounds per square inch by utilizing a positive displacement pump. The pressurized material is discharged by controllably opening a normally closed orifice of an airless spray gun. So far as I am aware, materials have not been delivered to an airless spray gun under a developed pressure of the order of 10,000 pounds per square inch and even higher pressures.

As is known, grease lubricators, oil transfer pumps and spray systems for low viscosity materials have been powered by air motors or piston and cylinder assemblies that are coupled to a controlled source of pneumatic pressure. Electric solenoids and electric motors have also been used to provide the required driving force for pumps to pressurize material of the foregoing types. When it is desired to deliver such materials to an airless spray gun at pressures of the order of 10,000 pounds per square inch in an environment that requires portability of the spray system, it is not economically feasible or practical to employ electrical generating equipment to develop the necessary electric power for a motor or solenoid to develop the forces necessary to pressurize the material to such a magnitude. The use of a rotary type pneumatic motor or pneumatically-powered piston and cylinder assembly demands not only a large capacity air supply system, but also there are certain acute and inherent disadvantages to the use of pneumatics as a motivating force for a pump. For example, high volumes of air at even relatively moderate pressures create severe moisture problems in a pneumatic supply system, particularly in an outside environment where temperatures may fall below freezing and even below 0° F. The storage tank, control devices and supply lines of a pneumatic system exposes workmen to severe hazards. Moreover, the required horsepower input to a portable pneumatic system is excessively large and the equipment is cumbersome to manipulate and control. Control of the power supply system for high pressure spraying of materials becomes critically important when such materials are delivered to an airless spray gun at pressures up to the order of 10,000 pounds per square inch and even greater pressures.

In known lubricator or spray systems, the orifice of the discharge apparatus is simply closed through the use of a control level to terminate the discharge of pressurized material. This causes the pump to proceed to a stall condition which occurs when a preset maximum pressurization of the material is exceeded. However, if the discharge orifice of an airless spray gun were blocked to terminate the discharge of materials pressurized to 10,000 pounds per square inch, the failure of a valve or other control means to act quickly will result in a momentary or even a longer period of time during which the material is pressurized to dangerously high pressures. Such abnormally high pressures would quickly reach 30,000 pounds per square inch or higher. Should this occur, material supply lines may burst and workmen would obviously be subject to an extremely hazardous working condition. Thus, I have done away with the conventional concepts for controlling the discharge of material in a lubricator or spray discharge system including the usual procedure of closing the discharge orifice of the airless spray gun to thereby cause the pumping system to proceed to a stall condition.

SUMMARY OF THE INVENTION

It is an object of the present invention to provide a method and apparatus for the airless discharge of liquid and semiliquid materials including low viscosity material such as thixotropic gels by utilizing hydraulic fluid pressure to pump and deliver such materials under relatively high pressure to a discharge means having either a nonclosable or a controllably closable orifice synchronous with control of the passage of fluid to a hydraulic pump to thereby initiate and terminate the discharge of the material.

According to the present invention, a liquid or semiliquid material is discharged by a method which includes the steps of: using a hydraulically-driven pump to withdraw and pressurize such material from a reservoir to flow within a conduit line; continually discharging the pressurized material within the conduit through a discharge means having an open discharge orifice that essentially remains in open communication with the conduit in a directly dependent relation to the existence of pressurized material by the hydraulically-driven pump; and terminating the discharge of the material by the discharge means only by diverting the supply of hydraulic fluid from the pump to thereby terminate pressurization of the material withdrawn from the reservoir. A discharge gun and an open ended collar with a discharge orifice in the side wall thereof are two preferred forms of the aforesaid discharge means.

The present invention is specifically useful in a method of applying a high-stress lubricant in the form of a thixotropic gel onto a surface wherein the method includes the steps of: stressing the thixotropic gel lubricant by using a hydraulically-driven pump to pressurize and withdraw the gel from a reservoir and thereby to increase the viscosity of the gel for flowing within a conduit, continually discharging the stressed thixotropic gel from the conduit through a nonclosable orifice toward a selected surface to receive a high-stress lubricant, and terminating the discharge of the thixotropic gel only by diverting the supply of hydraulic fluid from the pump to thereby terminate pressurization of the gel withdrawn from the reservoir.

The apparatus of the present invention includes the combination of: means for pressurizing hydraulic fluid, a hydraulic motor powered by the pressurized hydraulic fluid, valve means for controlling the hydraulic motor, a container forming a supply reservoir for liquid and semiliquid materials such as a viscous fluid, a thixotropic gel or a gel-type grease, pump means driven by the hydraulic motor to withdraw the material from the container while pressurizing the withdrawn material, discharge means having an open discharge orifice coupled by a conduit line to the pump means for discharging pressurized material and means to control the discharge of the material only by controlling the pressurization of the material by the pump means. It is contemplated according to the present invention that the aforesaid discharge means includes a discharge gun having a control switch on the casing of the discharge gun that further includes an open orifice for discharging the pressurized material. Alternatively, the aforesaid discharge means includes an open-ended collar with resilient wiper means at the opposite ends thereof to form an internal chamber wherein the pressurized material is discharged from at least one open orifice onto a cable or the like. The cable is guided into the chamber by a funnel-like casting or casing at one end of the collar. The collar is supported by a base coupled to a conduit into which the lubricated cable is drawn after passing through the lubricating chamber in the collar.

According to one aspect of the present invention, the apparatus includes the combination of: fluid pressure generating means including a pump defining a source of hydraulic fluid pressure, a hydraulic motor powered by the hydraulic fluid pressure, a fluid control valve for controlling the hydraulic motor, a container forming the supply reservoir for liquid or semiliquid material that is to be discharged, a suction tube assembly including pump means driven by the hydraulic motor to withdraw the material from the container while pressurizing the withdrawn material, discharge means including a casing defining an open discharge orifice, a conduit to conduct the pressurized material from the suction tube assembly to the discharge means, an electrical switch on the casing of the discharge means to provide an electrical enabling signal, a controller adapted to respond to the electrical enabling signal to enable the passage of hydraulic fluid from the fluid control valve to the hydraulic motor, and regulator means controlling the hydraulic motor in response to a predetermined desired pressurization of the material conducted by the conduit from the suction tube assembly.

These features and advantages of the present invention as well as others will be more fully understood when the following description is read in light of the accompanying drawings, in which:

FIG. 3 is a second embodiment of an airless spray system according to the present invention;

FIG. 4 is a hydraulic control valve assembly forming part of the system according to the embodiment of FIG. 3;

Figure 1:
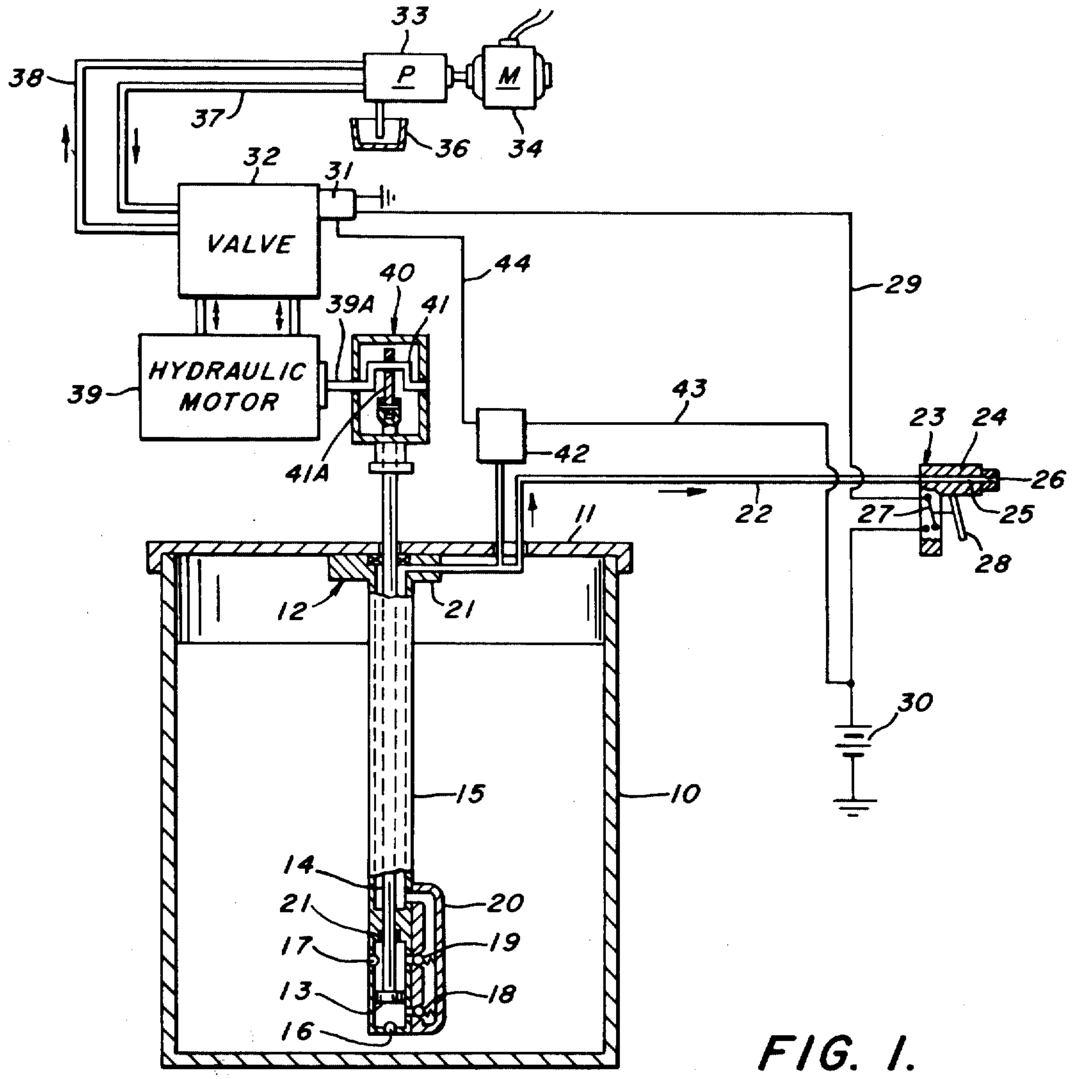
FIG. 1 is a schematic diagram of an airless spray system using hydraulic power for the pressurization of material to be sprayed.

In FIG. 1 there is illustrated a container that forms a supply reservoir for material to be discharged in the form of an airless spray or steam. While not so limited, it is contemplated, according to the present invention, that the material to undergo the airless spray discharge is a relatively low viscosity material selected from the group including fluid or semifluid products such as grease, oil, paint, gel-like compounds, sealants, undercoating materials, fuels and the like. The present invention is particularly adaptable for the airless spraying of a thixotropic gel such as is sold under the trade name "Vitalife" No. 400G. This product is a thixotropic lubricant defined to mean that when the product is subjected to stress, it becomes fluid until the stress is removed. This property of the material is utilized to materially reduce the coefficient of friction when pulling a cable through an underground conduit. The compound has excellent corrosive preventive properties and is suitable for use with metal conduits as well as polyethylene conduits. Typical properties of this lubricant are given in the following table:

TABLE ("Vitalife" No. 400C)

| | |
|---|---|
| Physical State | Gel-type semi-fluid grease |
| Dropping Point or Flow Point | 138° F |
| Flash Point, COC | 340° F |
| Penetration, at 77° F | 330 |
| Gravity, ° API, 60° F | 19.0 |
| Pounds per gallon | 7.83 |

The container 10 is normally closed by a lid 11 which also supports a suction tube assembly 12 having a material receiving end that is submerged in the material within the container 10. The suction tube assembly includes either a double-acting pump such as hereinafter described, or a single-acting pump. Both such types of pumps include a piston 13 coupled to a rod 14 by which the piston is reciprocated within a sleeve 15. The lower end of the sleeve 15 is closed and in a double-acting pump two entry ports are provided that form part of check valves 16 and 17. In a single-acting pump, only one such check valve is provided whereby fluid is pressurized by movement of the piston in only one direction. The valves 16 and 17 are alternatively opened when the piston reciprocates within the sleeve to withdraw the material into the sleeve. Two additional check valves 18 and 19 are urged by springs into a closed position to close ports at the opposite sides of the piston 13. When the piston moves downward, for example, within the sleeve, material is withdrawn into the sleeve through the check valve 17. Check valve 16 is then closed and the withdrawn material is forced to escape under a pressure selected within the range of several pounds per square inch, e.g., 1 or 2 P.S.I., up to 10,000 or even to 12,000 pounds per square inch through a passageway in the casing 20 attached to the side of the sleeve. As clearly apparent from the FIG. 1, the pressurized material in the casing 20 is returned to the interior of the sleeve just above a seal 21 that surrounds rod 14. When the piston is moved upwardly in the sleeve, material is withdrawn from the container 10 through the check valve 16 and check valve 17 is closed while check valve 19 is forced opened by the pressure of the material to pass into the passageway within the casing 20. The pressurized material is, therefore, forced upwardly along the tube where it is passed through a collar 21 to a discharge opening that is coupled to conduit 22 preferably in the form of a high pressure and flexible conduit line. The free end of the conduit 22 is connected to a spray discharge device 23 that includes a casing 24 defining an internal passageway 25 for conducting the material from the conduit 22 to an open and preferably nonclosable spray discharge orifice 26.

According to the present invention, the spray discharge orifice remains open so long as pressurized material is delivered to it. I prefer to employ a discharge gun that has a discharge orifice which is never blocked so that material will be discharged from this orifice so long as the material is presented to the orifice under a pressure that exceeds the atmospheric pressure by some predetermined amount. The orifice 26 can, if desired, be adjustable as to its size but it must not be closable in a way which would prohibit the flow of material under pressure from the spray device. To initiate or terminate the discharge of material from the spray device, the present invention provides that the casing of the spray device additionally includes an electrical switch 27 which, when closed, for example by a pivotally mounted trigger 28 or pushbutton, provides an enabling signal in line 29. The enabling signal in line 29 may be a low voltage electrical signal provided by a power supply 30 that is coupled to line 29 through the switch 27. The absence of an electrical signal in line 29 is utilized in the control system as a disabling signal. The trigger 28 may, if desired, be used to synchronize the opening of a closable orifice by a stopper member with the production of an enabling signal. Line 29 is coupled to an electrical solenoid 31 that forms a prime mover of a fluid control element incorporated in a well-known manner with a fluid control valve assembly 32. In place of the solenoid 31, a manual control rod or a hydraulic pilot pressure mechanism may be employed, particularly when the pressurized fluid is gasoline or the like. Moreover, all control lines may be in the form of hydraulic fluid lines to operate in response to applied pilot pressure. The valve assembly 32 is constructed in a manner that is per se well known in the art.

The valve assembly 32 is used to control the flow of hydraulic fluid from a pump 33 that is driven by an electrical motor 34. Other types of motors can be employed. The horsepower requirements for the electric motor 34 are relatively low and, therefore, it is suitable for powering by a portable generator or the like. It will be understood that, if desired, the pump 33 may be driven by a power take-off system from an internal combustion engine of a land vehicle. The pump 33 receives hydraulic fluid from a tank 36 and provides pressurized hydraulic fluid via line 37 to the valve assembly 32 which also returns hydraulic fluid to the pump via line 38. In a nonspraying mode of operation, hydraulic fluid is not fed to the pump but instead the fluid is returned from the valve by line 38 to the tank 36 by the normal position of a spool element or other fluid direction control member forming part of control valve 32. When it is desired to spray discharge the material, an enabling signal must be delivered by line 29 to the solenoid 31 to shift the spool element for delivering the hydraulic fluid from valve 32 to a rotary hydraulic motor 39. The hydraulic motor is of the standard well-known design and has a rotary output shaft 39A that is coupled to the drive input shaft of a transmission 40. The transmission is actually a motion changing device that converts the rotary output motion of the hydraulic motor into a linear motion through the use of, for example, a crank 41 and a connecting rod 41A. The linear output motion from the transmission 40 is coupled directly to the rod 14.

The spray system, according to FIG. 1, additionally includes safety switch means in the form of a fluid discharge pressure regulator switch 42. The switch 42 is of any standard and well-known design. One of the contacts of switch 42 is connected to line 43 from the power supply 30 and the other contact is connected to line 44. Line 44 provides an electrical signal to the control solenoid 31 in a manner to stop the flow of hydraulic fluid from the valve 32 to the motor 39 when the pressure of the material in line 22 exceeds a predetermined or desired value. In this way, the driving force developed by the hydraulic motor is limited which, in turn, limits the pressurization of the material withdrawn from the container 10.

Figure 2:
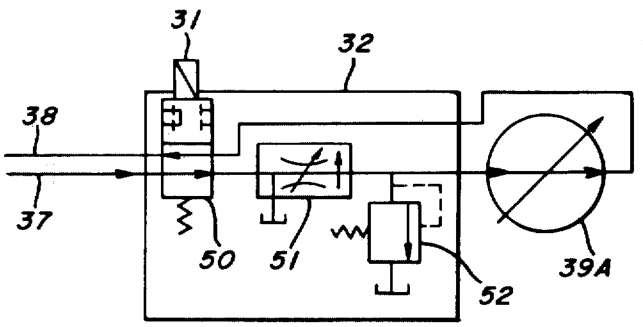
FIG. 2 is a schematic diagram of the hydraulic control valve assembly in the system according to the embodiment of FIG. 1.

In FIG. 2, the component parts of the valve assembly 32 are illustrated diagrammatically and they include a direction control valve 50 which is positioned in opposition to a spring force by the solenoid 31. When in the position shown in FIG. 2, the direction control valve 50 delivers the pressurized hydraulic fluid in line 37 to a flow control valve 51 that is, in turn, coupled to a pressure relief valve 52. The pressure relief valve avoids the development of excessive fluid pressure in the line coupled with rotary motor 39A. The fluid return line from the motor 39A is passed through valve 50 and coupled to the fluid return line 38.

In FIG. 3, there is illustrated a second embodiment of the present invention which differs from that already described in regard to the first embodiment by the employment of a double-acting and hydraulically-powered piston and cylinder assembly 55. In view of this, the same reference numerals have been applied to like parts in FIGS. 1 and 3 and the previous description in regard to FIG. 1 will apply with equal effect. The piston and cylinder assembly 55 has the rod end of the piston coupled by an adapter 56 to the rod 14. A limit switch 57 provides an electrical signal in lines 58 for controlling the necessary reverse operation of valve assembly 59 whereby the flow of hydraulic fluid is reversed in lines 60 and 61 to the opposite sides of the piston when it approaches an end wall of the cylinder.

FIG. 4 illustrates in greater detail the component parts making up the valve assembly 59. In this respect, the valve assembly 59 includes the same component parts shown in FIG. 2 in regard to valve assembly 32 which, as previously described, includes a flow control valve, a pressure relief valve and a directional control valve. The fluid in return lines 62 and 63 from the valve assembly 32 is coupled by a second directional control valve 64. This valve is controlled by solenoids 65 that respond to the electrical signal in lines 58 to shift the valve when the limit switch 57 is tripped by the movement of the piston to an end of its stroke. When this occurs, pressurized hydraulic fluid is applied to the opposite side of the piston from which it had been previously applied to reverse the direction of movement by the piston.

The present invention further includes a lubricator collar assembly 70 which forms a preferred alternative to the discharge device 23 hereinbefore described. The lubricator collar assembly 70 is particularly adapted for applying pressurized lubricant onto the outer surface of a cable or the like immediately prior to drawing or pulling the cable into a protective conduit.

Figure 5:
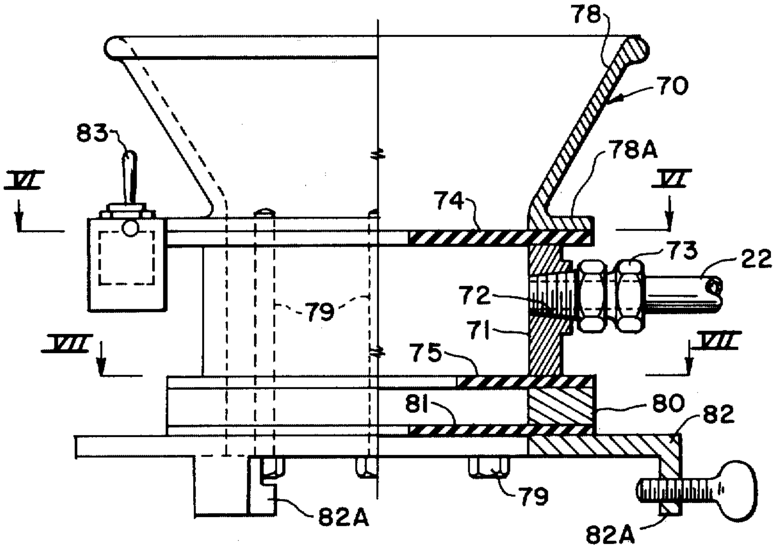
FIG. 5 is a cross-sectional view through one embodiment of a lubricator collar assembly according to the present invention.

As shown in FIG. 5, the lubricator collar assembly 70 includes an open-ended collar 71 having an annular side wall provided with an open discharge orifice 72 that is coupled by a threaded connector 73 to the free end of the conduit 22 as a substitute for the spray discharge device 23 previously described. Disc-shaped wipers 74 and 75 made from resilient material, e.g., rubber or NEOPRENE (Trademark) are positioned on the upper and lower ends, respectively, of the collar 71. An internal annular chamber is thereby formed wherein pressurized material, e.g., lubricant is brought into contact with the outer surface of a cable within the annular collar. As clearly shown in FIGS. 6 and 7, the wipers 74 and 75 include the central annular openings 76A and 76B, respectively, with spaced-apart and radially-extending cuts that form arcuate wiper segments. These segments are elastically deformable by the passage of a cable that is larger in diameter than the diameter of the annular opening 76A or 76B. A truncated, conically-shaped funnel 78 forms an entry guide for the cable that is to be lubricated and then pulled into the conduit. The funnel has an integral disc 78A having spaced-apart tapped holes that receive the threaded ends of tension bolts 79. These bolts pass through opening 79A in the wipers 74 and 75. The arrangement of parts is such that the bolts 79 are employed to clamp the wiper 74 onto the upper surface of the collar 71 and to clamp the wiper 75 between the bottom surface of the collar and a spacer 80. A third wiper 81, which is constructed in the same manner as previously described in regard to wipers 74 and 75, is clamped by the tension bolts between the spacer 80 and a base 82. Lugs 82A extend downwardly from the base 82. These lugs may further include tapped holes to receive screw-type fasteners for attaching the lubricator collar onto the exposed end of a conduit into which a lubricated cable is to be drawn. The disc 78A has a portion which projects outwardly from the funnel 78 to provide a support for a switch 83 preferably in the form of a toggle switch to provide an electrical signal to control the discharge of material through the orifice in the collar only by controlling the pressurization of the material in the same manner as previously described hereinbefore in regard to FIGS. 1–4.

Figure 8:
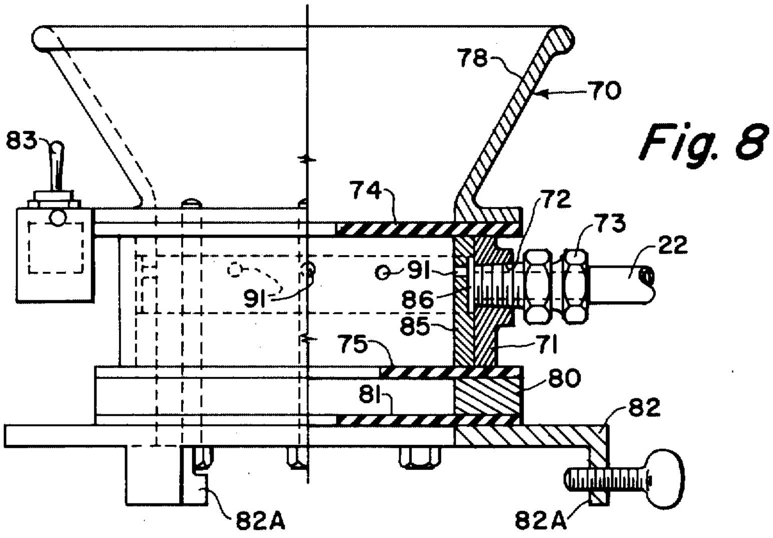
FIG. 8 is a cross-sectional view through a second embodiment of a lubricator collar assembly according to the present invention.
Figure 6:
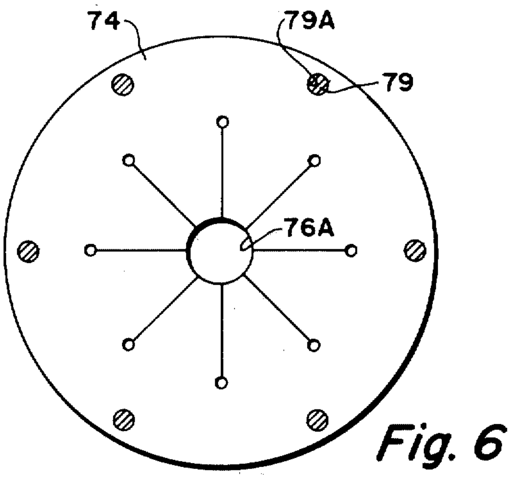
FIG. 6 is a sectional view taken along line VI—VI of FIG. 5.
Figure 7:
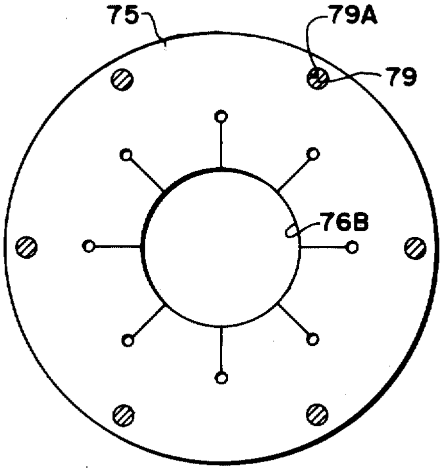
FIG. 7 is a sectional view taken along line VII—VII of FIG. 5.

FIG. 8 illustrates a modified form of lubricator collar assembly which differs from that previously described in regard to FIGS. 5–7 by the employment of a sleeve 85 that is inserted into the annular collar 71 in a tightly-fitting relation with the internal wall surface formed by the continuous annular side wall of the collar. This sleeve has an annular recess 86 that forms an annular reservoir between the sleeve and the collar to distribute material discharged thereto from the orifice 72. The sleeve further includes spaced-apart and radially-extending orifices 91 used to discharge the material from the reservoir into the chamber space within the sleeve. By employing this sleeve with a plurality of discharge orifices, the lubricant or other material is discharged at spaced points about the outer periphery of the surface of the cable passing through the lubricator collar. This greatly enhances the application of the uniform film of lubricant onto the cable. Inasmuch as the lubricator collar shown in FIG. 8 embodies essentially the same parts as previously described in regard to FIGS. 5–7, the same reference numerals have been applied to corresponding parts.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. Apparatus powered by hydraulic fluid pressure for the delivery of liquid and semiliquid materials, such as a viscous fluid, a thixotropic gel or a gel-type grease, said apparatus including the combination of:

means for pressurizing hydraulic fluid, a hydraulic motor powered by the pressurized hydraulic fluid, valve means for controlling said hydraulic motor, a container forming a supply reservoir for said liquid and semiliquid materials, pump means driven by said hydraulic motor to withdraw the material from the container while pressurizing the withdrawn material, an open-ended collar having an open discharge orifice in the side wall thereof, a conduit line to interconnect said pump means with the open discharge orifice of said discharge means for discharging pressurized material, resilient wiper means at the opposite ends of said collar to form an internal chamber wherein the pressurized material delivered by said conduit line is discharged from said open orifice onto the surface of an article while passing through the collar between said resilient wiper means, and means to control the discharge of the material from said open discharge orifice only by controlling the pressurization of the material by said pump means.

2. The apparatus according to claim 1 wherein said discharge means further includes a funnel-like casing at one end of said collar with a resilient wiper means therebetween, a base at the other end of said collar with a resilient wiper means therebetween, and fastening means to interconnect said funnel-like casing and said base.

3. The apparatus according to claim 2 wherein said means to control the discharge of the material includes a switch means carried by said funnel-like casing.

4. The apparatus according to claim 2 wherein said discharge means further includes a spacer ring between said base and said collar with said resilient wiper means at each side of said spacer ring.

5. The apparatus according to claim 1 wherein said open-ended collar includes a continuous annular side wall, and wherein said discharge means further includes a sleeve member having spaced-apart and radially-extending orifices, said sleeve member being fitted within said collar member to form an annular orifice therebetween for delivering pressurized material to said orifices.

6. The appartus according to claim 5 wherein said sleeve member includes an annular recess within the outer cylindrical surface thereof to form said annular reservoir for communicating with each of said radially-extending orifices.

7. The apparatus according to claim 1 further comprising mounting means on said open-ended collar for removably supporting said collar.

8. A method of discharging liquid and semiliquid materials including a thixotropic gel onto a surface of a cable prior to the passage of the cable into a conduit, said method including the steps of:

attaching to an end of said conduit an open-ended collar having an open discharge orifice in the side wall and resilient wipers at opposite ends, thereby forming a chamber to discharge said materials onto the cable, using a hydraulically-driven pump to withdraw and pressurize such material from a reservoir to flow within a conduit line, continually discharging the pressurized material within the conduit through said open discharge orifice that essentially remains in open communication with the conduit line and the chamber in a directly dependent relation to the existence of pressurized material by the hydraulically-driven pump, terminating the discharge of the material by the discharge means only by diverting the supply of hydraulic fluid from the pump to thereby terminate pressurization of the material withdrawn from the reservoir, and detaching said open-ended collar from said conduit.

9. The method of claim 8 including the further step of producing an enabling signal by switch means on said open-ended collar to direct pressurized hydraulic fluid to the hydraulically-driven pump and thereby cause withdrawal and pressurization of material in the reservoir to flow within the conduit line.

10. A method of applying a high-stress lubricant in the form of a thixotropic gel onto a surface of a cable prior to passage of the cable into a conduit, said method including the steps of:

attaching to an end of said conduit an open-ended collar having an open discharge orifice in the side wall and resilient wipers at opposite ends thereof forming a chamber to discharge the thixotropic gel lubricant onto the cable, stressing the thixotropic gel lubricant up to pressures of the order of 10,000 pounds per square inch by using a hydraulically-driven pump to pressurize the gel withdrawn from a reservoir and thereby increase the viscosity of the gel to flow within a conduit line, continually discharging the stressed thixotropic gel lubricant from the conduit through the open discharge orifice toward the surface of said cable to receive the high-stress lubricant, terminating the discharge of the thixotropic gel lubricant only by diverting the supply of hydraulic fluid from said pump to thereby terminate the pressurization of the gel withdrawn from the reservoir, and detaching said open-ended collar from said conduit.

11. The method according to claim 10 wherein said thixotropic gel lubricant has a dropping point of 138° F or higher.

12. The method according to claim 10 wherein said continually discharging the stressed thixotropic gel lubricant includes discharging such lubricant from an annular chamber surrounding said collar through a plurality of spaced open discharge orifices in the peripheral surface of said collar.

* * * * *